(No Model.)
J. R. FREE.
GUIDE CHART FOR TYPE WRITERS.
No. 429,614. Patented June 10, 1890.
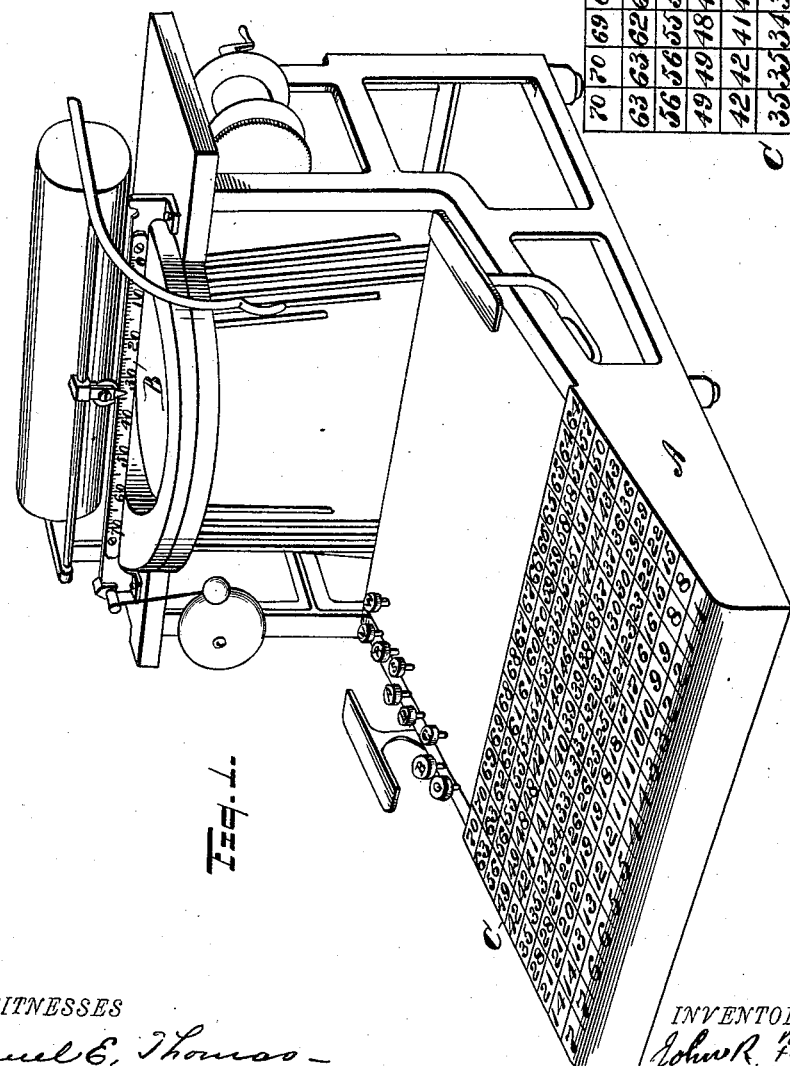
WITNESSES
Samuel E. Thomas
Edgar S. Wheeler
INVENTOR
John R. Free
by
Roscoe B. Wheeler
Attorney.

UNITED STATES PATENT OFFICE.

JOHN R. FREE, OF STRATHNAIRN, ONTARIO, CANADA.

GUIDE-CHART FOR TYPE-WRITERS.

SPECIFICATION forming part of Letters Patent No. 429,614, dated June 10, 1890.

Application filed May 18, 1889. Serial No. 311,329. (No model.)

*To all whom it may concern:*

Be it known that I, JOHN R. FREE, a citizen of Canada, residing at Strathnairn, in the county of Grey, Ontario, Canada, have invented certain new and useful Improvements in Guide-Charts for Type-Writers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a numeral guide-chart to be used in connection with type-writers and like instruments, and is designed to assist the operator in determining the starting-point at which to commence the writing of a word or heading, so as to locate said word or heading equally on each side of a given center of the paper, all of which will be fully hereinafter set forth, and the essential features of the device pointed out particularly in the claim.

In the accompanying drawings, forming a part of the specification, Figure 1 is a view of a type-writing machine known as the "Caligraph," (a portion of the machine being broken away,) having on the base thereof my improved numeral guide-chart. Fig. 2 is a plan of said numeral guide-chart.

As indicated in the drawings, A represents the type-writer, B the scale thereof, and C the numeral guide-chart.

The numerals of the chart C correspond with the numerals on the scale B of the type-writer, and are arranged in duplicate from 1 to 70, decreasing in denomination from left to right the same as on the scale B. The scale B on the type-writer indicates the type-spaces, there being room for seventy consecutive letters or characters across the space of writing.

In writing a heading to fill a certain space the trouble with the operator is to locate the heading equally on each side of a given center of the paper. By the use of the herein-described chart this difficulty is overcome, and the starting-point at which to commence writing, so as to proportionately divide the heading on each side of a fixed center, is easily and quickly determined.

As an illustration, desiring to write the heading "Hardware," so as to divide the word equally on each side of the exact center of the page or sheet, there being seventy letter or character spaces across the sheet or space of writing, said exact center would therefore be at 35, as indicated on the type-writer scale B. To determine the starting-point, so as to write said heading equally on each side of the center 35, the operator, starting at the number 35 on the chart, spells out the heading and counts to the right on the chart one number for each letter of the heading. The number on which the last letter of the heading terminates will indicate the starting-point, as follows: Starting at the number 35 on the chart and counting to the right the heading "Hardware" will end on No. 32, which indicates the starting-point. Set the pointer on the type-writer carriage at 32 on the scale B and write said heading. The result will be "Hardware" written equally on each side of the center of the sheet of paper.

In writing headings of more than one word count one number on the chart for the space between the words as well as for each letter of the words. To write the heading "The Car-Wheel Co.," commence at No. 35 on the chart and count to the right, one number for each letter of the heading and one for each space between the words thereof. The last letter of said heading will terminate on No. 28. Set the pointer on the type-writer carriage at 28 on the scale B and write said heading. The result will be "The Car-Wheel Co." written equally on each side of the center of the paper. This result is reached by the numbers on the chart being in duplicate, and counting toward the starting-point, as before described, the operation of dividing by one is performed, so that when the starting-point is reached just one-half of the number of spaces the heading will occupy will be at the left of the center. Consequently when the heading is written it will be equally divided on each side of the center.

For convenience the numbers on the chart are placed in the series of rows, as shown; but the numbers may be arranged in a continuous row, if desired.

The characters or numerals of the chart may be printed or stamped on the base of the type-writer, as shown in Fig. 1; or they may be printed or stamped on any suitable material—such as card-board or a metal plate—and secured to the base of the type-writer in any desired manner. The numerals higher than the center 35 are to be used for assisting in marginal spacing on the right of the written sheet, should it be desired to locate a heading at the right of the center, or as in writing a date in the upper right-hand corner. The numerals lower than the center 35 are to be used for marginal spacing when the heading is located at the left of the center, or as in writing an address.

The numeral-chart is used in a like manner in connection with both scales of the machine, (scale B and the scale on the traveling carriage of the machine.) The scale on the carriage is not shown in Fig. 1, as such scale is well known to those skilled in the art and will be readily understood.

Having thus fully set forth my invention, what I claim as new, and desire to secure by Letters Patent, is—

In combination with the spacing-scale of a type-writer, a numeral-chart containing the numerals corresponding with those on said spacing-scale, said numerals being in duplicate, for the purposes specified.

In testimony whereof I affix my signature in presence of two witnesses.

JOHN R. FREE.

Witnesses:
W. E. SILVERTHORNE,
W. W. WOOD.